UNITED STATES PATENT OFFICE.

FRANCIS ARTHUR FREETH, OF GREAT CROSBY, AND HERBERT EDWIN COCKSEDGE, OF HERNE HILL, LONDON, ENGLAND.

PROCESS OF MAKING PURE AMMONIUM CHLORID.

1,035,696.  Specification of Letters Patent.  Patented Aug. 13, 1912.

No Drawing.    Application filed December 10, 1910.   Serial No. 596,634.

*To all whom it may concern:*

Be it known that we, FRANCIS ARTHUR FREETH and HERBERT EDWIN COCKSEDGE, subjects of the King of Great Britain, residing, respectively, at Great Crosby, in the county of Lancaster, and Herne Hill, S. E., London, both in the Kingdom of England, have invented certain new and useful Processes for Making Pure Ammonium Chlorid, of which the following is a specification.

In our Patent No. 970,909, we described a process for the preparation of pure or practically pure ammonium chlorid directly and without recrystallization by the reaction between equivalent quantities of sodium chlorid and ammonium sulfate at a temperature of 103° C. or thereabout, when the reaction is performed in the presence of that quantity of water which will suffice to yield after the completion of the reaction, a solution saturated with respect to ammonium chlorid and sodium sulfate at the temperature of the reaction.

We have now discovered a process which enables us to prepare at temperatures below 100° C. pure or practically pure ammonium chlorid directly and without recrystallization by the reaction between equivalent quantities of ammonium sulfate and sodium chlorid in presence of a solution containing ammonium chlorid, sodium sulfate, and sodium chlorid in proportions which must be varied with the temperature of reaction employed, but which for any given temperature of reaction are fixed and definite.

The solution of ammonium chlorid, sodium sulfate, and sodium chlorid in the presence of which the reaction is performed will hereinafter be called the "nucleus solution." The nucleus solution is prepared as follows: To an aqueous solution of ammonium chlorid saturated at approximately the temperature at which, in the subsequent process, the ammonium chlorid (obtained by cooling the products in solution resulting from the reaction between the equivalent quantities of ammonium sulfate and sodium chlorid added to the nucleus solution) is to be removed from the solution, anhydrous sodium sulfate is added until no more will dissolve, and then a quantity of sodium chlorid the ratio of which to the water present in the nucleus solution depends upon the temperature at which the anhydrous precipitated sodium sulfate (formed by the reaction between the equivalent quantities of ammonium sulfate and sodium chlorid subsequently added to the nucleus solution) is to be removed from the solution. Hydrated sodium sulfate may be employed in the preparation of the nucleus solution instead of the anhydrous salt provided that the quantity of water used be reduced by an amount equivalent to that contained in the hydrated salt. The quantities of ammonium sulfate and sodium chlorid added to this nucleus solution, always in equivalent proportions, are such that the resultant solution after completion of the reaction is saturated or nearly saturated with regard to ammonium chlorid at the temperature of the reaction and is of course also saturated with regard to sodium sulfate, inasmuch as this salt is precipitated. This nucleus solution is only prepared once. At the end of the process which results in the separation of solid ammonium chlorid, the nucleus solution reproduces itself automatically, that is, the solution remaining after the separation of ammonium chlorid is identical in composition with the original nucleus solution. It is subjected to a fresh cycle of operations by addition of equivalent quantities of ammonium sulfate and sodium chlorid to the same amount as before, when sodium sulfate and ammonium chlorid are again formed, and so on. The number of cycles may be repeated indefinitely.

When the reaction between the equivalent quantities of ammonium sulfate and sodium chlorid added to the nucleus solution is complete, that is, when the whole of the ammonium sulfate has been transformed into ammonium chlorid, the anhydrous sodium sulfate precipitated is removed at the temperature at which the reaction is performed, and the liquor remaining is cooled to separate ammonium chlorid. The sodium sulfate, after washing to remove adherent mother liquor, is pure or practically pure. Now we have discovered that this liquor from which the precipitated sodium sulfate has been removed must not be cooled below a certain minimum temperature because below that temperature the ammonium chlorid which separates out is contaminated with sodium sulfate whereas at or above that temperature it is free from sodium sulfate. This minimum temperature depends upon the temperature at which the reaction between the equivalent quantities of ammonium sulfate and sodium chlorid is performed. The higher the reaction temperature, the higher also is this minimum temperature. This minimum temperature below which the liquor must not be cooled is definite and fixed for each temperature at which the reaction is performed.

Our process therefore consists in first preparing the nucleus solution as above described, and then adding to it, either before, during, or after heating to the temperature at which the reaction between ammonium sulfate and sodium chlorid is to be performed, (such temperature being always below 100° C.) equivalent quantities of ammonium sulfate and sodium chlorid, either together or separately, in such amount that after the reaction between them is complete, that is, after the whole of the ammonium sulfate has been transformed into ammonium chlorid, the resultant solution is saturated or nearly saturated as regards ammonium chlorid at the temperature of the reaction.

The mixture, during, and after, the addition of ammonium sulfate and sodium chlorid is stirred and meanwhile maintained at the temperature selected for the reaction until the whole of the ammonium sulfate has been transformed into ammonium chlorid. Any loss of water which occurs during this operation by evaporation must be compensated for by the addition of an equivalent quantity of water, either as such, as wash liquor from a previous operation, or in the form of brine—that is, a solution of common salt in water: in the latter case the quantity of solid sodium chlorid added is decreased to an extent equivalent to the quantity of sodium chlorid in the brine so added. The anhydrous sodium sulfate precipitated is then separated at the temperature of the reaction and washed to remove adherent mother liquor, and the solution remaining cooled to deposit ammonium chlorid, the extent to which the solution is cooled depending upon the temperature at which the above mentioned reaction has been performed.

The ammonium chlorid precipitated is separated from the solution, washed to remove adherent mother liquor, and then dried or drained by any well known means: it is then free or practically free from sodium sulfate or other impurities. The liquor which remains after the separation of ammonium chlorid is identical in composition with the original nucleus solution. Equivalent quantities of ammonium sulfate and sodium chlorid are again added exactly in the same way as, and in the same quantities as before; the process is then repeated as before at exactly the same temperature, and so on indefinitely.

The following are examples of the method by which the process can be carried out:—

Example I: When the temperature selected for the reaction is 85° C., a nucleus liquor is prepared by dissolving 33.3 parts of ammonium chlorid, 26.2 parts of anhydrous sodium sulfate, and 4.5 parts of sodium chlorid, in 100 parts of water. The solution is agitated and, either while it is being heated to 85° C., or when it is at that temperature, 37.9 parts of ammonium sulfate and 33.6 parts of sodium chlorid are added, either together or separately, these being equivalent quantities of the two salts, and the total quantity that which will, after completion of the reaction, give a solution just saturated with respect to ammonium chlorid at 85° C. The agitation is continued and the whole maintained at 85° C., any loss of water by evaporation being made up as previously explained, until the ammonium sulfate is completely transformed into ammonium chlorid: this may require an hour or more. The anhydrous sodium sulfate precipitated is then separated at 85° C. and the liquor is cooled to a minimum temperature of 25° C. this being the minimum temperature to which it can be cooled in this case without separation of sodium sulfate together with ammonium chlorid. The ammonium chlorid is removed at the same temperature by any well known means, and after washing is pure, or practically pure. The liquor remaining after the separation of the ammonium chlorid has the same composition as the original nucleus solution, and is ready for treatment with equivalent quantities of ammonium sulfate and sodium chlorid as above: this cycle can be repeated indefinitely.

Example II: When the temperature selected for the reaction is 60° C., a nucleus solution is prepared by dissolving 27.3 parts of ammonium chlorid, 20.0 parts of anhydrous sodium sulfate, and 10.2 parts of sodium chlorid, in 100 parts of water. To this solution, either when being heated to 60° C., or when at that temperature, is added 22.7 parts of ammonium sulfate and 20.1 parts of sodium chlorid, these being equivalent quantities, and the total quantity such as will suffice to just give a solution saturated with respect to ammonium chlorid at 60° C. when the reaction is complete. The reaction is completed under the same conditions and with the same precautions as before, but at 60° C. The anhydrous sodium sulfate precipitated is removed at 60° C. and the liquor then cooled to a minimum temperature of 15° C., which is in this case the minimum temperature to which it can be cooled without separation of sodium sulfate with the ammonium chlorid. The ammonium chlorid precipitated on cooling is then separated as previously described, and the solution remaining has the same composition as the nucleus solution originally used, and is ready for a fresh cycle of operations as above.

We declare that what we claim is:—

1. The herein-described improved process for making pure ammonium chlorid from ammonium sulfate and sodium chlorid which consists in stirring together at temperatures below 100° C. equivalent quantities of ammonium sulfate and sodium chlorid with that quantity of the herein described nucleus solution containing ammonium chlorid, sodium sulfate, and sodium chlorid which just suffices to yield after the reaction a solution substantially saturated with respect to ammonium chlorid at the temperature at which the anhydrous sodium sulfate precipitated by the reaction is removed from the solution: continuing the agitation at about the temperature selected and for which the composition of the nucleus solution is adapted until the reaction is finished, and compensating by addition of water for any water which may have been lost by evaporation: then separating out at that same temperature the precipitated anhydrous sodium sulfate and washing it: cooling the liquor remaining after separation of the precipitated sodium sulfate to a temperature above that at which sodium sulfate is precipitated from it: removing the ammonium chlorid which separates out and washing it to remove adhering nucleus solution.

2. The process of making pure ammonium chlorid, which consists in causing to react at a temperature of substantially 85° centigrade substantially equivalent quantities of ammonium sulfate and sodium chlorid, namely, substantially 57.9 parts of ammonium sulfate and 33.6 parts of sodium chlorid, in the presence of 100 parts of a nucleus solution, the composition of which solution consists of substantially 33.3 parts of ammonium chlorid, 26.2 parts of anhydrous sodium sulfate, and 4.5 parts of sodium chlorid in 100 parts of water; agitating the mixture at or about the temperature selected for the reaction until all the ammonium sulfate is converted into ammonium chlorid; adding water in sufficient quantity to compensate for any evaporation; removing the precipitate of anhydrous sodium sulfate at the temperature of the reaction and washing it; cooling the solution from which the sodium sulfate precipitate has been removed; separating the precipitated ammonium chlorid; and washing it, whereby the solution remaining after separating the ammonium chlorid constitutes the nucleus solution aforesaid for the reaction at the temperature chosen in the previous reaction.

In witness whereof, we have hereunto signed our names this 28 day of November 1910, in the presence of two subscribing witnesses.

FRANCIS ARTHUR FREETH.
HERBERT EDWIN COCKSEDGE.

Witnesses:
WM. P. THOMPSON,
CHAS. LESLIE.